United States Patent [19]

Costin

[11] 4,269,943
[45] May 26, 1981

[54] THERMALLY STABLE RESINS PREPARED BY BROMINATION OR CHLORINATION OF AROMATIC POLYMER BEADS FOLLOWED BY SULPHONATION

[75] Inventor: Charles R. Costin, Jenkintown, Pa.

[73] Assignee: Rohm and Haas Company, Philadelphia, Pa.

[21] Appl. No.: 69,039

[22] Filed: Aug. 23, 1979

[51] Int. Cl.³ .............................. C08F 8/22; C08F 8/36
[52] U.S. Cl. ....................................................... 521/33
[58] Field of Search .......................................... 521/33

[56] References Cited

U.S. PATENT DOCUMENTS 3,256,250  6/1966  Trilette .................................... 521/33

FOREIGN PATENT DOCUMENTS 767216  11/1977  South Africa ............................. 521/33
1393594  5/1975  United Kingdom ...................... 521/33

Primary Examiner—Joseph L. Schofer
Assistant Examiner—Peter F. Kulkosky
Attorney, Agent, or Firm—Jordan J. Driks

[57] ABSTRACT

A process for producing a strong acid cation exchange resin having enhanced thermal stability comprises the steps of (1) chlorinating or brominating the aromatic nuclei of polymer beads prepared from a monomer system selected from the class consisting of (a) monovinyl aromatic monomers and polyvinyl aromatic monomers and mixtures thereof and (b) one or more monomers of (a) with up to about 5% by weight of the polymer of a monomer selected from the class consisting of acrylonitrile, methyl acrylate, methyl methacrylate, and mixtures thereof, and when a monovinyl aromatic monomer is present, a polyvinyl aromatic monomer is also present in an amount of at least about 4% by total weight of the polymer or copolymer, and (2) sulfonating the chlorinated or brominated polymer to produce a resin having enhanced thermal stability. A strong acid cation exchange resin prepared by the above process wherein the aromatic nuclei of the polymer beads are chlorinated or brominated.

10 Claims, No Drawings

THERMALLY STABLE RESINS PREPARED BY BROMINATION OR CHLORINATION OF AROMATIC POLYMER BEADS FOLLOWED BY SULPHONATION

BACKGROUND OF THE INVENTION

This invention relates to a process for producing a strong acid cation exchange resin having enhanced thermal stability. More particularly, this invention relates to a process as aforesaid and the resins produced by the process wherein the strong acid cation exchange resins so produced have enhanced thermal stability and may be used as catalysts for high temperature reactions such as hydration of olefins, alkylation of phenols and the like, which take place at temperatures above at least about 130° C.

U.S. Pat. No. 3,256,250 discloses a process for preparing a sulfonated organic ion exchange resin useful as a catalyst for hydration and dehydration reactions and having improved thermal stability. The '250 patent discloses that a styrene-divinylbenzene copolymer, for example, is first sulfonated and subsequently chlorinated with chlorine. The patent states that one chlorine atom per aromatic ring can be introduced into the molecule.

Ion exchange resins prepared by the process of the '250 patent do not exhibit as much thermal stability as is possible using the process of the present invention. This is believed to be due to the fact that when the aromatic nucleus is first sulfonated and subsequently chlorinated, the sulfonic acid groups sterically hinder the chlorine groups from attaching to the aromatic ring and instead, because the chlorine groups are sterically hindered from attaching to the aromatic ring, the attachment of the chlorine to the polyalkylene side chain of the molecule is promoted. Additionally, because the sulfonic acid moiety is attached to the aromatic nuclei, the aromatic ring is deactivated toward ionic chlorination thereby rendering the attachment of chloro substituents to the ring extremely difficult and thereby favoring the attachment of chloro substituents to the side chain. The attachment of chlorine to the polyalkylene side chain of the molecule does nothing to enhance the thermal stability of the resin.

It is believed that attachment of the chlorine to the aromatic nuclei of the molecule deactivates the ring and, because of this deactivation, the rate of desulfonation at high temperature is decreased. Thus, the process of the '250 patent while resulting in the attachment of some chlorine to the aromatic nuclei, because of the steric hinderance of the sulfonic acid group already present on the aromatic nuclei and the ring deactivation due to the sulfonic acid group, the amount of chlorine attached to the aromatic nuclei is not as great as possible. Because of this diminished attachment of chlorine to the aromatic nuclei, the thermal stability of the sulfonic acid resin is not as great as that obtained by the present invention because the amount of ring deactivation is not as great as obtained by the present invention and therefore, at high temperatures, the rate of desulfonation is greater than the rate of desulfonation using the present invention.

British Pat. No. 1,393,594 is directed to the preparation of thermally stable cation exchange resins which are sulfonated crosslinked macroreticular structures containing aromatic units wherein the aromatic moiety has a halogen substituent directly on the aromatic ring. The '594 patent teaches that the sulfonated resin is prepared by polymerizing a halogenated monomer with a crosslinking compound such as divinylbenzene and thereafter sulfonating the resultant polymer. The process of the '594 patent, while an improvement in enhancing thermal stability, does not result in as enhanced a thermal stability as is believed possible. This is so because the halogen substitution was only on the monovinyl aromatic moiety of the polymer and not on the polyvinyl aromatic moiety. When the polymer was sulfonated, sulfonation took place on both the monovinyl aromatic moiety as well as the polyvinyl aromatic moiety of the polymer. As stated previously, the presence of a halogen on the aromatic moiety of the polymer (regardless of whether it be the monovinyl or polyvinyl moiety) is desirable because the halogen deactivates the ring and thus decreases the rate of desulfonation at high temperature. Thus, the '594 patent still suffered from desulfonation at high temperatures because of the lack of a halogen on that portion of the molecule which was prepared from a polyvinyl aromatic monomer.

U.S. Pat. No. 3,342,755 is directed to a sulfonated halogen containing cation exchange resin which exhibits enhanced oxidative stability. The '755 patent teaches the preparation of a copolymer of a monovinyl aromatic monomer and a polyvinyl aromatic monomer, halogenating the resultant polymer under reaction conditions wherein the halogen is substituted for hydrogen on the polyalkylene side chain and particularly on the tertiary carbon on the polyalkylene side chain. The '755 patent teaches that halogenation should be accomplished in such a manner so that the halogen substitution does not take place on the aromatic nuclei of the molecule. The '755 patent teaches that the substitution of halogen on the aromatic nuclei of the molecule is to be avoided. This is not surprising in view of the fact that the '755 patent is concerned with oxidative stability and not with thermal stability.

It is an object of this invention therefore, to provide a process for enhancing the thermal stability of a strong acid cation exchange resin.

Another object of this invention is to enhance the thermal stability of a strong acid cation exchange resin by chlorinating or brominating a polymer prepared from a monovinyl aromatic monomer and a polyvinyl aromatic monomer and subsequently sulfonating the resultant polymer.

Still another object of this invention is to deactivate the aromatic nuclei of a sulfonated polymer of a monovinyl aromatic monomer and/or a polyvinyl aromatic monomer so that desulfonation of such polymer at high temperatures is greatly diminished.

A further object is to provide a thermally stable strong acid cation exchange resin.

Other objects and advantages will become apparent from the following more complete description and claims.

Broadly, this invention contamplates a process for preparing a strong acid cation exchange resin having enhanced thermal stability comprising the steps of (1) chlorinating or brominating the aromatic nuclei of polymer beads prepared from a monomer system selected from the class consisting of (a) monovinyl aromatic monomers and polyvinyl aromatic monomers and mixtures thereof and (b) one or more monomers of (a) with up to about 5% by weight of the polymer of a monomer selected from the class consisting of acrylonitrile, methyl acrylate, methyl methacrylate and mixtures thereof, and when a monovinyl aromatic monomer is present, a polyvinyl aromatic monomer is also present in an amount of at least about 4% by total weight of the polymer, and (2) sulfonating the chlorinated or brominated polymer beads whereby the resultant cation exchange resin exhibits enhanced thermal stability.

This invention also contemplates a thermally stable strong acid cation exchange resin prepared by the above process.

Unless otherwise indicated, the term "polymer" as used herein includes both homopolymers and copolymers.

In practicing the process of this invention and preparing the compositions of this invention, the polymer may be prepared in any manner which is well known in the art. For example, polymerization may be accomplished by stirring and heating, for example at 50° to 150° C., a suspension of the polymerizable monomers in water or an aqueous solution of a protective colloid or thickening agent such as starch, gum tragacanth, or methylcellulose. By such polymerization while suspended in a liquid medium, the polymer may be obtained directly in the form of rounded and nearly spherical granules. The size of the granules or beads may be controlled, for example by the rate of stirring and the proportion of protective colloid or thickening agent employed, so as to obtain nearly all the product as granules of sizes suitable for use in ion exchange processes. The polymerization may also be carried out in the presence of a phase extender or precipitant so as to produce porous, macrorecticular beads or ion exchange resins; in known manner.

After the polymer beads have been prepared, they may then be chlorinated or brominated by (1) swelling the polymer in a suitable swelling agent, such as carbon tetrachloride, ethyl acetate, butyl acetate, ethylene dichloride, methylene dichloride, and the like for a predetermined period of time and then (2) adding a halogen carrier to the slurry and brominating or chlorinating by bubbling or adding chlorine or bromine while excluding light and at a temperature of from about −5° C. to about 50° C. and preferably from about 10° C. to about 25° C.

The amount of halogen carrier used is not critical and may vary widely from about 0.1% to about 50% based on the total weight of brominating or chlorinating agent plus halogen carrier. It is preferred, however, to use from about 0.2% to about 2% of halogen carrier. Among the halogen carriers which may be used are iodine, aluminum amalgam, pyridine, iron, ferric chloride, aluminum chloride and the like. Thus, by this method, a halogen such as chlorine or bromine may be introduced onto the aromatic nuclei of the polymer molecule.

The amount of chlorine or bromine introduced onto the aromatic nuclei of the polymer generally may vary widely from about 8% to about 25% based on the weight of the polymer.

Theoretically, it is desired that there be at least one chlorine or bromine attached to each aromatic nucleus of the polymer or copolymer beads prior to sulfonation or said beads. However, as a practical matter, the amount of chlorine or bromine attached to the aromatic nuclei of the polymer or copolymer beads will vary within the range set forth above.

Chlorination or bromination, as described above, is generally referred to as ionic halogenation. It is this ionic halogenation which results in the major portion of the halogenation taking place on the aromatic nuclei itself as opposed to the side chain so that the major portion of the halogenation occurs on the aromatic nuclei and thus the nuclei itself is deactivated so that, when the chlorinated or brominated polymer is subsequently sulfonated and used at a high temperature, the ring deactivation decreases the rate of desulfonation of the ion exchange resin at the high temperature (from about 130° C. to about 200° C.).

Sulfonation of the chlorinated or brominated polymer may take place in any manner well known to the art. Thus, the chlorinated or brominated polymer may be sulfonated by contacting the resin with gaseous sulfur trioxide or with sulfur trioxide dissolved in a solvent such as chloroform. Additionally, other conventional sulfonating agents such as chlorosulfonic acid or concentrated sulfuric acid may also be used. Whichever method of sulfonation is used, it is the aromatic nuclei of the chlorinated or brominated polymer which is sulfonated.

The temperature and reaction time necessary to accomplish sulfonation will depend somewhat upon the degree of crosslinking of the polymer and the selected sulfonating agent as well as the degree of sulfonation desired. For example, sulfonation may take place by charging the chlorinated or brominated polymer, concentrated sulfuric acid and ethylene dichloride or chloroform or carbon tetrachloride to a flask and heating the reaction mixture for from about 8 hours to about 20 hours at a temperature of between about 120° C. to about 135° C. After the reaction is completed, it is then quenched and the resultant product is washed with water till a predetermined pH of from about 4 to about 6.5 is obtained.

The monomers useful in the practice of this invention are the monovinyl aromatic monomers such as styrene, chlorostyrene, bromostyrene, vinyltoluene, vinylnaphthalene, ethyl styrene, alkyl substituted styrenes such as alpha methylstyrene, meta methylstyrene, para methylstyrene, and the like.

The polyvinyl aromatic monomers which are used may include divinylbenzene, divinyltoluene, divinylxylene, divinylnaphthalene, and the like.

The monomer system may comprise a mixture of a monovinyl aromatic monomer and a polyvinyl aromatic monomer or may comprise a polyvinyl aromatic monomer alone. When a mixture of an aromatic monovinyl monomer and an aromatic polyvinyl monomer is used, the aromatic polyvinyl monomer should be present in an amount of from about 4% to about 50% based on the total weight of the copolymer and preferably from about 7% to about 20%.

When a mixture of an aromatic monovinyl monomer and an aromatic polyvinyl monomer is used, the aromatic monovinyl monomer is present in an amount of from about 50% to about 96% based on the total weight of the copolymer and preferably from about 60% to about 93%.

The monomer system set forth above may also include up to about 5% by weight of the total polymer of acrylonitrile, methyl acrylate, methyl methacrylate, and the like and mixtures thereof.

In order to more fully illustrate the nature of this invention and the manner of practicing the same, the following examples are presented.

In the examples which follow, the abbreviation SSCC stands for salt splitting cation exchange capacity. The salt splitting cation exchange capacity is determined by placing the resin sample in a glass tube with a measured amount of reagent, sealing the tube and following the procedure set forth in "Ion Exchange Resins", Robert Kunin, Robert E. Krieger Publishing Company, Huntington, N.Y., (1972), on pages 342 and 343.

The percent of SSCC lost is the measure of thermal stability.

The phrase "Chloride Throw", as used in the examples, is the milliequivalents of chloride released from the polymer per gram of resin. The "Chloride Throw" is determined by placing a measured amount of the resin in a glass tube, adding a measured amount of deionized water to the glass tube, sealing the glass tube, heating the sealed glass tube at a temperature of either 190° C. for 70 hours or 150° C. for 10 days and thereafter opening the sealed tube and decanting the water. Thereafter, the chloride content of the water is determined by titration with silver nitrate using potassium chromate as an indicator.

EXAMPLE 1

To a 3-necked 5 liter flask equipped with a stirrer, condenser and gas inlet tube is added 1500 milliliters of carbon tetrachloride and 500 grams of a copolymer of styrene and 12%, by total weight of the polymer, of divinylbenzene. The carbon tetrachloride is heated to reflux (78° C.) and held there for 30 minutes. The resin slurry is then cooled to ambient temperature and one gram of iodine is added. The reaction mixture is stirred at ambient temperature until the iodine dissolves (about 30 minutes). The reaction vessel, which is now equipped with a dry ice condenser and a gas dispersion tube, is wrapped with a protective covering to exclude light and is then cooled to a temperature of 10° C. 490 grams of chlorine is introduced to the stirred, cold (10° C.) slurry through the gas dispersion tube over a 3 hour period. The temperature of the reaction slurry is maintained between 6° C. and 15° C. during the addition. After the addition is completed, the temperature is increased to 20° C. The chlorine reflux gradually subsides after 2 to 3 hours at 20° C. The reaction slurry is maintained at a temperature of 20° C. and is held at this temperature overnight. The chlorinated copolymer is then removed from the reaction vessel and is washed with sodium hydroxide solution followed by a water wash and a methanol wash. The resin is then dried at a temperature of 90° C. for about 15 hours. The chlorinated polymer contains 34.27% chlorine as determined by a standard elemental chlorine analysis procedure. 600 grams of the chlorinated copolymer prepared above; 3,480 grams of 99% sulfuric acid; and 192 grams of ethylene dichloride are charged to a 3 necked 5 liter flask equipped with a stirrer, thermometer and Dean-Stark trap and is heated to a temperature of 60° C. and held there for a period of 2 hours while stirring. After the 2 hours, the reaction temperature is increased to 120° C. and held at this temperature for 19 hours. The reaction mixture, which is at a temperature of 120° C., is then quenched with water according to the following dilution profile:

First Dilution (a) 225 grams of water at a rate of 8 grams per minute
(b) 425 grams of water at a rate of 16 grams per minute
(c) siphon aqueous sulfuric acid from the flask until the level of liquid just covers the top of the product when stirring is discontinued.

Second Dilution (a) 675 grams of water at a rate of 16 grams per minute
(b) siphon aqueous sulfuric acid from the flask until the level of liquid just covers the top of the product when stirring is discontinued.

Third Dilution (a) 675 grams of water at a rate of 16 grams per minute 3,750 grams of water is added continuously to the reaction flask while siphoning liquid from the flask at a rate which maintains the liquid level within the reaction flask. The temperature is allowed to drop to ambient temperature. The product is then backwashed with water until a pH greater than 4 is obtained. The sulfonated product is removed from the flask. The yield of sulfonated product is 1580 ml. The resultant resin (acid form) has a salt splitting cation capacity of 3.46 meq/g of dry resin, 47.4% solids as determined by heating a weighed sample of the resin at 110° C. to 115° C. overnight and then again weighing the sample. The resin has a pKa of 1.75 and contains 17.84% chlorine.

EXAMPLE 2

The procedure of Example 1 is repeated except that 4.5 liters of ethylene dichloride per 1200 grams of copolymer is used as the swelling solvent; 1,578 grams of chlorine is used and 3.2 grams of iodine is used. After the chlorination is complete, the excess ethylene dichloride is removed by siphoning from the flask. The sulfonation is conducted directly upon the ethylene dichloride swollen resin using 9,130 grams of 98.4% sulfuric acid. The yield of sulfonated chlorinated copolymer is 5620 ml. The acid form of the product has a salt splitting cation capacity of 3.16 meq/g of dry resin and 51% solids. The final product contains 15.18% of chlorine.

EXAMPLE 3

18.4 grams of a dry macroreticular sulfonic acid resin prepared from a monomer system of styrene and 12% divinylbenzene is chlorinated with 14 grams of chlorine according to the procedure set forth in Example 1 except that a solution of 100 ml of water, saturated with iodine, is used as the solvent. The product has a salt splitting cation capacity of 4.01 meq/g of dry resin, 45.6% solids and a chlorine content of 14.04%.

EXAMPLE 4

A comparison is made between the thermal stability of the resin of Example 1 (chlorination of the copolymer prior to sulfonation); the resin of Example 3 (chlorination of a sulfonated resin); a commercial strong acid cation exchange resin prepared by sulfonating a copolymer of styrene containing 12% of divinylbenzene; and a resin prepared by sulfonating a copolymer of chlorostyrene containing 12% of divinylbenzene. Thermal stability experiments are conducted as has been described in the specification immediately preceeding the examples. The results are as follows:

TABLE 1

| Resin | SSCC[a] | % Solids | Testing at 190° C. for 70 hours | | Testing at 150° C. for 10 days | |
|---|---|---|---|---|---|---|
| | | | % SSCC Lost[a] | Chloride Throw | % SSCC Lost[a] | Chloride Throw |
| Ex. 1 | 3.46 | 47.4 | 35.8 | 0.08 | 9.2 | not det. |
| Commercial Strong Acid Resin Described Above | 5.13 | 42.0 | 67.6 | not det. | 23.2 | not det. |
| Ex. 3 | 4.01 | 45.6 | 53.3 | 0.28[a] | not det. | not det. |
| Resin prepared by sulfonating a copolymer of chlorostyrene with 12% divinylbenzene | 3.92 | 47.5 | 32.8 | 0.02 | 15.4 | 0.02 |

[a](Milliequivalents per gram of dry resin)

A comparison is made between the thermal stability of an additional resin prepared as in Example 1 and the resin prepared by sulfonating the copolymer of chlorostyrene containing 12% of divinylbenzene. The results of the thermal stability testing of the chlorostyrene-divinylbenzene copolymer for 10 days at 150° C., has been set forth in Table 1. After the sealed tubes containing the resins are heated for 10 days at 150° C., the sealed tubes are opened and the SSCC determined. The resins are removed from the tube, washed with water and then with 4% hydrochloric acid to return the resin to the acid form and again washed with water. Thereafter the resins are again placed in tubes with a measured amount of reagent and the tubes are then sealed and the sealed tubes are heated at 150° C. for thirteen days (23 days total for each sample). The results are as follows:

TABLE 2

| Resin | SSCC[a] | % Solids | Testing at 150° C. | | | |
|---|---|---|---|---|---|---|
| | | | 10 Days | | 23 days (10 days testing then samples regenerated then 13 additional days testing) | |
| | | | % SSCC Lost | Chloride Throw | % SSCC Lost | Chloride Throw |
| Example 1 | 3.05 | 53.9 | 9.9 | 0.11 | 13.0 | 0.05 |
| Resin prepared by sulfonating a copolymer of chlorostyrene with 12% divinylbenzene | 3.92 | 47.5 | 13.8 | 0.01 | 16.5 | 0.03 |

[a](Milliequivalents per gram of dry resin)

EXAMPLE 5

6 samples of a copolymer of styrene and 12% divinylbenzene are chlorinated, to varying degrees, and sulfonated as is set forth in Example 1. The results, which illustrate that thermal stability is a function of the chlorine content of the products, are presented below.

TABLE 3

| Resin | Chlorine Content | | Testing at 190° C. for 70 hours | | Testing at 150° C. for 10 days | |
|---|---|---|---|---|---|---|
| | Copolymer | Sulfonated Product | % SSCC Lost[a] | Chloride Throw | % SSCC Lost[a] | Chloride Throw |
| 1 | 20.48% | 8.45% | 49.0 | 0.03 | 6.07 | 0.02 |
| 2 | not det. | 10.77% | 46.5 | 0.06 | not det. | not det. |
| 3 | 28.51% | 13.82% | 43.2 | 0.05 | 8.5 | 0.01 |
| 4 | 32.38% | 17.48% | 35.3 | 0.06 | 2.4 | 0.04 |
| 5 | 34.27% | 17.84% | 35.8 | 0.08 | not det. | not det. |
| 6 | 40.73% | 28.63% | 32.1 | 0.29 | not det. | not det. |

[a](Milliequivalents per gram of dry resin)

While this invention has been described in terms of certain preferred embodiments and illustrated by means of specific examples, the invention is not to be construed as limited except as set forth in the following claims.

I claim:

1. A process for producing a strong acid cation exchange resin having enhanced thermal stability comprising the steps of (1) chlorinating or brominating the aromatic nuclei of polymer beads, said chlorine or said bromine being introduced onto said aromatic nuclei in an amount of from about 8% to about 25% based on the weight of the polymer, said polymer beads being prepared from a monomer system consisting essentially of (a) from about 50% to about 96%, based on the total weight of the monomers present, of a monovinyl aromatic monomer, the balance being a polyvinyl aromatic monomer and (b) the monomers of (a) with up to about 5% by weight of the polymer of a monomer selected from the class consisting of acrylonitrile, methyl acrylate, methyl methacrylate, and mixtures thereof, and (2) sulfonating the chlorinated or brominated polymer beads whereby the resultant cation exchange resin exhibits enhanced thermal stability.

2. A process according to claim 1 wherein said polymer beads are chlorinated or brominated to the extent of from about 8% to about 25% based on the weight of the polymer.

3. A process according to claim 1 wherein said monovinyl aromatic monomer is styrene and said styrene is present in an amount of from about 50% to about 96% based on the total weight of the copolymer.

4. A process according to claim 1 wherein said polyvinyl aromatic monomer is divinylbenzene and said divinylbenzene is present in an amount of from about 4% to about 50% based on the total weight of the polymer.

5. A process according to claim 1 wherein said chlorination is accomplished in the substantial absence of light by passing chlorine gas through a slurry of the polymer beads in the presence of a halogen carrier and at a temperature of from about −5° C. to about 50° C.

6. A process according to claim 5 wherein said halogen carrier is iodine.

7. A process according to claim 1 wherein said monomer system is styrene, divinylbenzene and acrylonitrile.

8. A process according to claim 1 wherein said monomer system is styrene, divinylbenzene and methyl acrylate.

9. A process according to claim 1 wherein said sulfonation is accomplished with sulfuric acid.

10. A process according to claim 1 wherein said sulfonation is accomplished with chlorosulfonic acid.

* * * * *